United States Patent
Ford

(10) Patent No.: US 6,211,821 B1
(45) Date of Patent: Apr. 3, 2001

(54) APPARATUS AND METHOD FOR DETERMINING PITCH AND AZIMUTH FROM SATELLITE SIGNALS

(75) Inventor: Thomas J. Ford, Calgary (CA)

(73) Assignee: NovAtel, Inc., Calgary (CA)

( * ) Notice: Subject to any disclaimer, the term of this patent is extended or adjusted under 35 U.S.C. 154(b) by 0 days.

(21) Appl. No.: 09/398,530

(22) Filed: Sep. 16, 1999

Related U.S. Application Data

(60) Provisional application No. 60/100,560, filed on Sep. 16, 1998.

(51) Int. Cl.[7] ............................. G01S 5/02; H04B 7/185
(52) U.S. Cl. ......................................... 342/357.11
(58) Field of Search ........................................ 342/357.11

(56) References Cited

U.S. PATENT DOCUMENTS

| | | | |
|---|---|---|---|
| 5,185,610 | 2/1993 | Ward et al. | 342/357 |
| 5,506,588 | 4/1996 | Diefes et al. | 342/357 |
| 5,534,875 | 7/1996 | Diefes et al. | 342/357 |
| 5,543,804 | 8/1996 | Buchler et al. | 342/357 |
| 5,726,659 * | 3/1998 | Kee et al. | 342/352 |
| 5,923,286 | 7/1999 | Divakaruni | 342/357 |

* cited by examiner

Primary Examiner—Thomas H. Tarcza
Assistant Examiner—Fred H. Mull
(74) Attorney, Agent, or Firm—Cesari and McKenna, LLP

(57) ABSTRACT

A navigational apparatus includes a receiver, two antennas, and a computational unit to receive satellite positional signals and provides corrected position, azimuth, and pitch readings. The computational unit: determines differences in the signal carrier measurements output by the receiver; rejects or accepts carrier ambiguity candidates based on predefined criteria; and estimates multipath on successive pairs of carrier observations to obtain the corrected readings.

12 Claims, 4 Drawing Sheets

APPARATUS AND METHOD FOR DETERMINING PITCH AND AZIMUTH FROM SATELLITE SIGNALS

CROSS REFERENCE TO RELATED APPLICATION

The present Application is related to Provisional Application Ser. No. 60/100,560 filed Sep. 16, 1998.

BACKGROUND OF THE INVENTION

1. Field of the Invention

The present invention is related to navigational systems for vessels and flight vehicles and, more particularly, to a navigational apparatus for using satellite positional signals to determine pitch, azimuth, and position.

2. Description of the Prior Art

It is known in the art to utilize a redundant set of north-seeking gyroscopes to determine the pitch and the heading, or azimuth, of a ship or aircraft. The function of the gyroscopes is to provide to a vessel, for example, an uninterrupted and continuously-smooth attitude reading to be used as an input to a rudder control loop and to the orientation function of a radar image.

A set of two heading sensors is usually specified for most marine navigation. For vessels larger than 500 tons, there is a requirement that at least one of the heading sensors be certified by the International Marine Organization (IMO). This certification ensures that the navigation equipment meets reliability requirements. For these large vessels, the heading sensors must provide continuous heading, that is, there must be no significant heading outage under any circumstances. In addition, if the heading is linked to the auto-pilot or radar, the heading system must ensure that there are no rapid heading changes and the system must not output a heading that indicates a heading change opposite to the actual change in direction of the vessel.

Gyrocompasses are typically used as the heading sensors. The cost of satisfying IMO requirements with a pair of gyrocompasses is about $200,000. While the use of gyrocompasses has proven to be reliable and has become the standard for shipboard navigation, the use of satellite positional signals in conjunction with a magnetic sensor can provide a low-cost and reliable alternative to at least one of the gyrocompass pair.

While the art describes GPS systems used for determining position, azimuth, and pitch of a vessel or flight vehicle, there remains a need for improvements that offer advantages and capabilities not found in presently available devices, and it is a primary object of this invention to provide such improvements.

It is another object of the invention to provide a relatively inexpensive method and apparatus for obtaining position, azimuth, and pitch readings.

Other objects of the invention will be obvious, in part, and, in part, will become apparent when reading the detailed description to follow.

SUMMARY OF THE INVENTION

A navigational apparatus, which receives satellite pseudorange and carrier signals and provides corrected position, azimuth, and pitch readings, and which uses carrier-to-noise ratio values to correct for multipath, includes a receiver, two antennas, and a computational unit. The computational unit determines differences in the signal carrier measurements output by the receiver, rejects or accepts carrier ambiguity candidates based on predefined criteria, and estimates the level of multipath-induced error on pairs of carrier observations to enhance the carrier-based attitude solution generated by the system.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
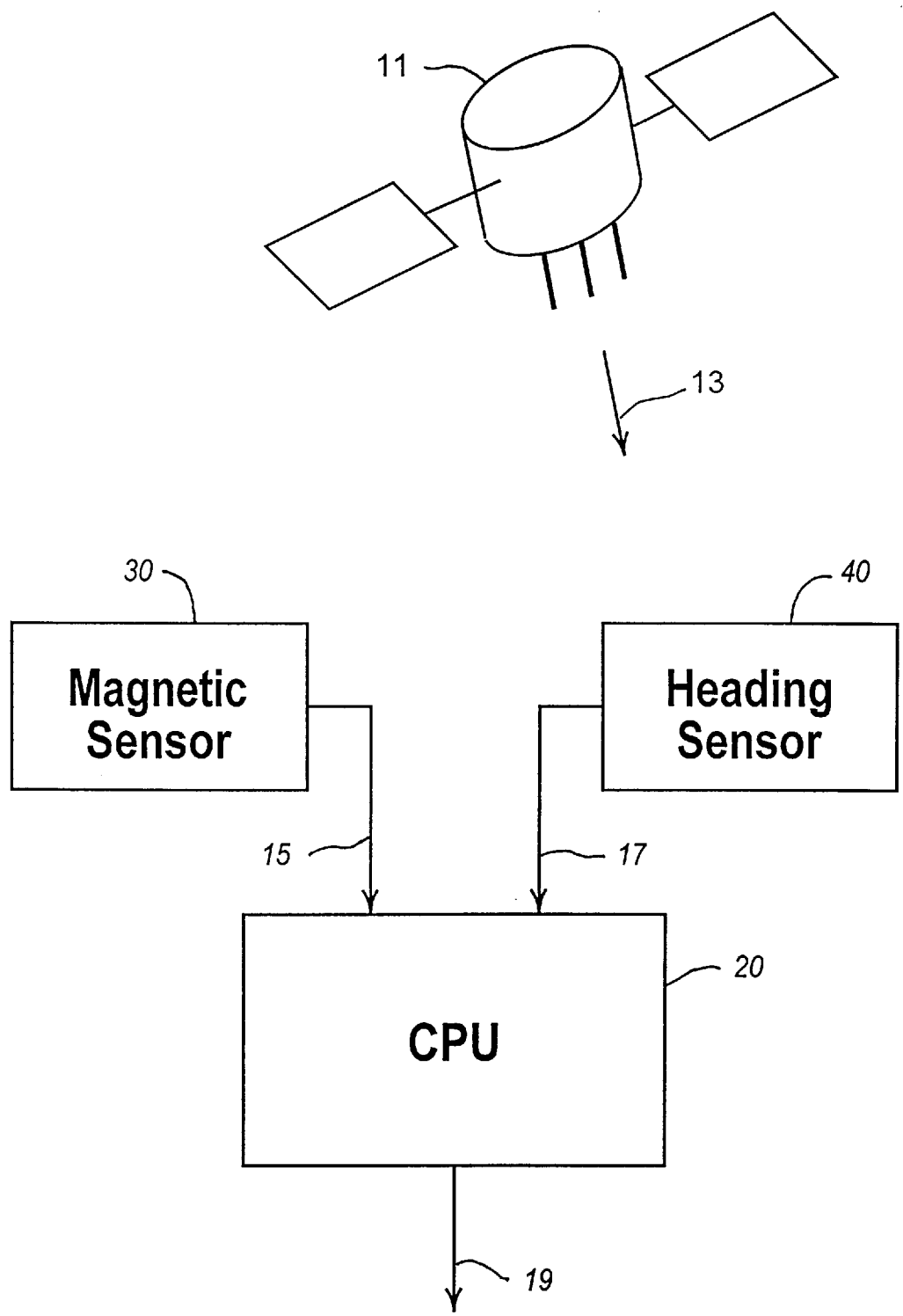
FIG. 1 is a diagrammatical view of a navigation system in accordance with the present invention, including a magnetic sensor, heading sensor, and computational unit.

FIG. 1 is a diagrammatical view of a navigation system 10 in accordance with the present invention. The navigation system 10 includes an integration unit 20 which receives data inputs from a magnetic sensor 30 and a heading sensor 40. The magnetic sensor 30 may be a magnetic compass. The beading sensor 40 is preferably a single-axis attitude sensor and is used to acquire a positioning signal 13 from a satellite 11, such as a Global Positioning System (GPS) satellite. The output signal 15 of the magnetic sensor 30 has slowly-changing biases but good continuity. The output signal 17 of the heading sensor 40 is unbiased but has intermittent integrity errors. The output signal 17 is used to correct the output signal 15. The corrected output signal 15 is used to ensure the integrity of the output signal 17 and to provide a continuous azimuth output 19 when the positioning signal 13 is poor or unavailable. By using the heading sensor 40 in accordance with the method described below, it is possible to produce azimuth and pitch readings with an accuracy of 0.4 degrees one sigma or better using a 1.0 meter baseline, and positional accuracy in the 5–20 cm range.

Figure 2:
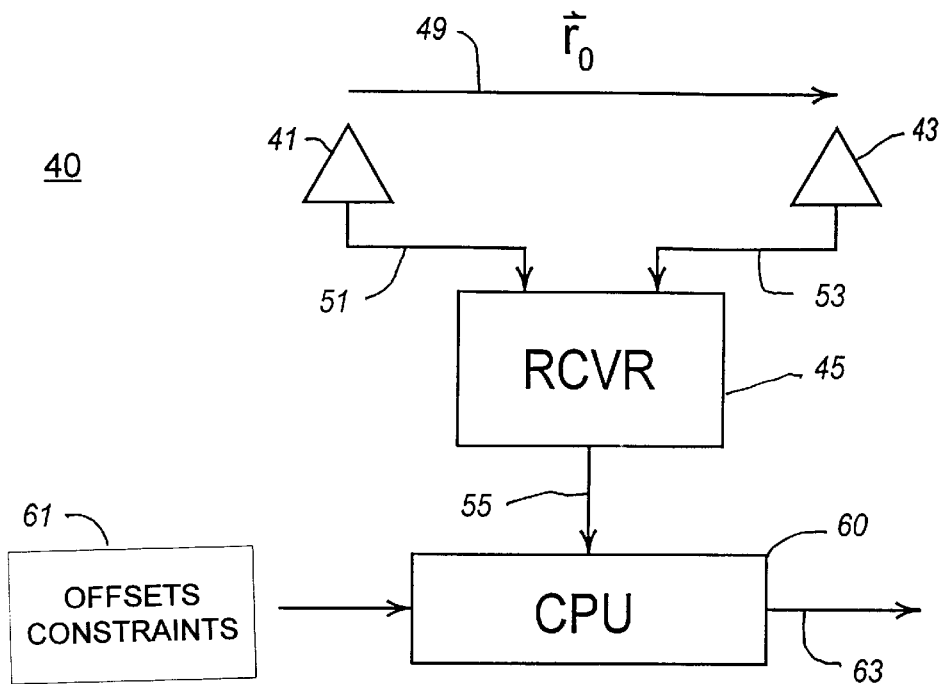
FIG. 2 is a functional block diagram of the heading sensor of FIG. 1.

FIG. 2 is a functional block diagram of the heading sensor 40. The heading sensor 40 includes an RF receiver 45 which inputs a data set 51 of pseudorange and carrier measurements corresponding to positioning signal 13 acquired by a primary antenna 41, and also inputs a data set 53 of pseudorange and carrier measurements corresponding to positioning signal 13 acquired by a secondary antenna 43. In a preferred embodiment, the RF down conversions and filtering are linked to a common digital section so that both RF sections use the same oscillator. As a result, the difference in signal propagation delay through the two RF paths remains essentially constant. A computational unit 60 inputs the receiver output 55, which includes pseudorange and carrier measurements, and carrier-to-noise estimates of the cross-correlated signals.

In the configuration shown, positioning signals from six satellites, for example, will produce six single-difference observations. By using a common oscillator and single-difference observations, the only differences present in the signals 51 and 53 will be a result of antenna geometry and a relatively constant difference in signal propagation delay from the respective antennas to the common digital section of the receiver 45. Once it has been determined, this propagation delay difference (i.e., line bias) can be treated as a very slowly changing bias in the filtering process. This removes a degree of freedom from the physical model and reduces the number of required observations from four to three. Additionally, the height difference between the primary antenna 41 and the secondary antenna 43 is strongly correlated with the oscillator error resulting from the use of two receivers. When a single difference process with a common oscillator is used, then this height difference can be determined to a greater precision, compared with a double-difference process. This greater precision results in a more accurate pitch reading.

User-supplied data 61 may also be provided to the computational unit 60. The user can define the azimuth and pitch offsets to be applied to the internally computed azimuth and pitch. This allows the user more flexibility when installing the navigation system 10, especially on aircraft and helicopters where the primary antenna 41 is located over the cockpit and the secondary antenna 43 is mounted close to the tail. In such a configuration, a 180° heading offset is used to offset to provide the output of the heading sensor 40 with the same orientation as the actual vehicle heading. When installed in an aircraft, a pitch offset may also be input to provide a pitch reading of zero degrees for level flight.

In typical operation, the heading sensor 40 uses differences in the carrier observations made at the primary antenna 41 and the secondary antenna 43 to generate a baseline 49 (denoted by vector $\vec{r}_0$). The baseline 49 is rotated from ECEF coordinates to the local level frame and the ratio of the north and east components of the baseline 49 are used to compute the azimuth. Similar calculations are made to compute the pitch angle. A part of this procedure requires the determination of the cycle ambiguities associated with the difference in carrier measurements, as follows.

Figure 3A:
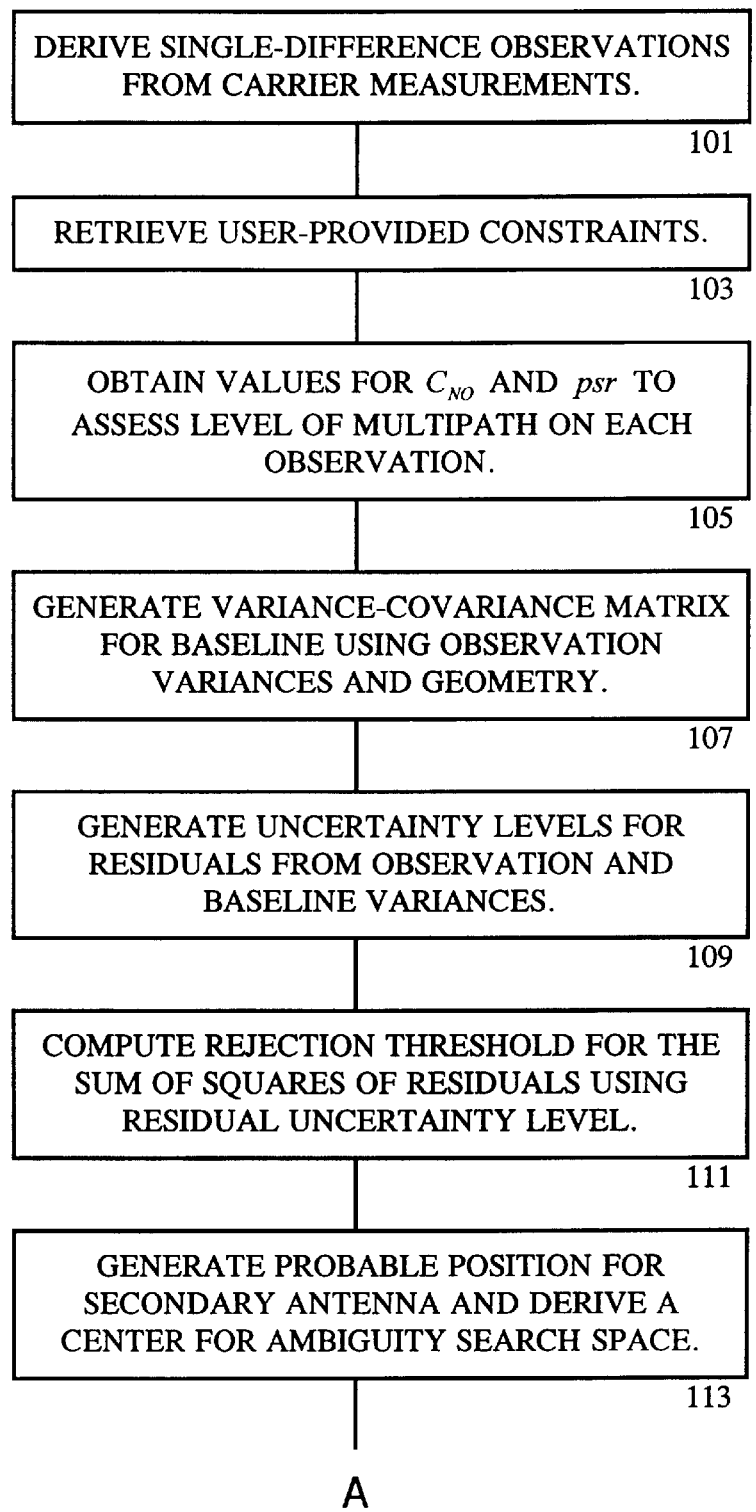
FIGS. 3A and 3B are a flow diagram illustrating the operation of the heading sensor of FIG. 1.
Figure 3B:
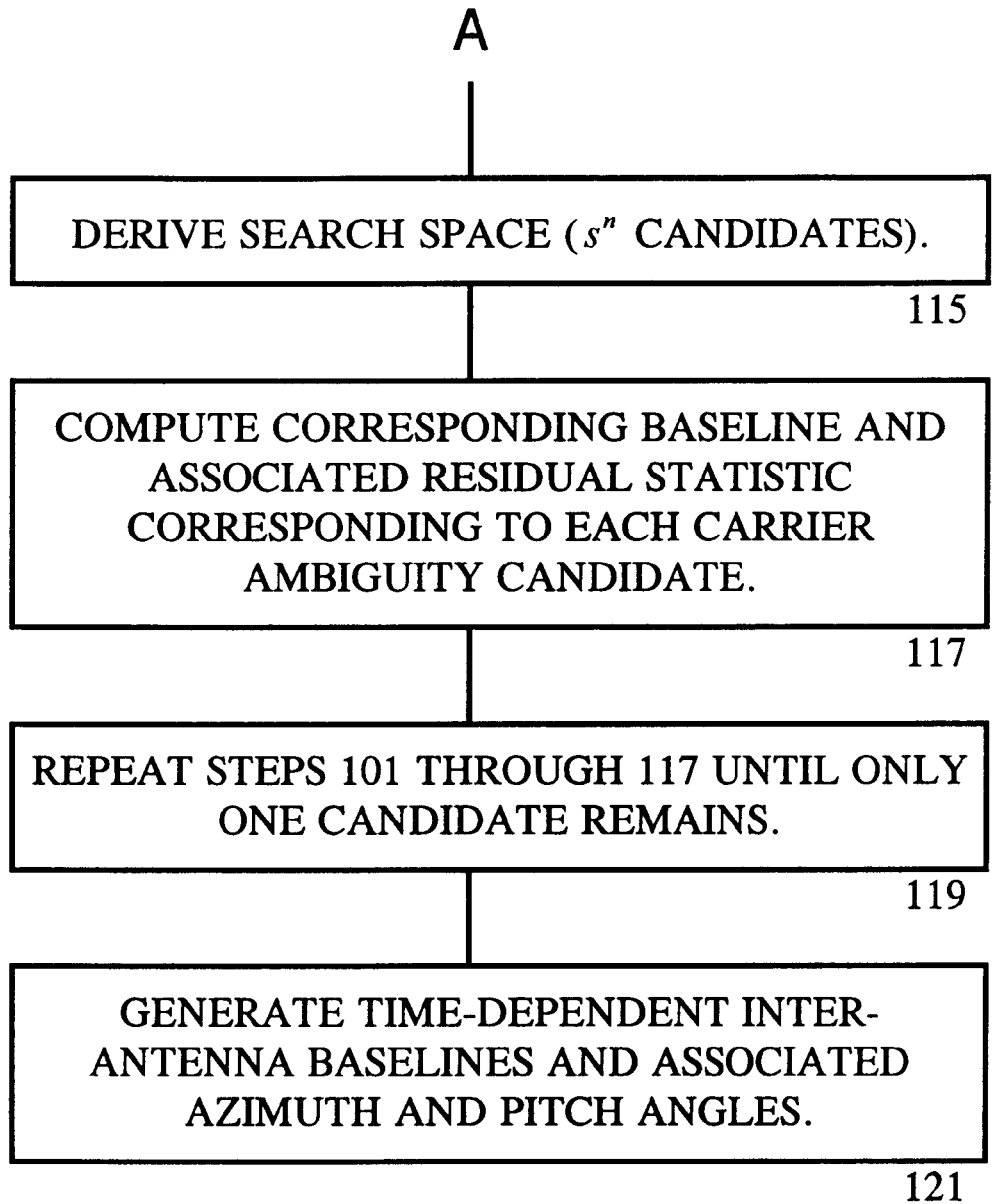

The operation of the heading sensor 40 can best be explained with reference to FIG. 3. Carrier measurements are used to form a plurality of single-difference observations, at step 101. User-supplied constraints are input to the computational unit 60, at step 103. The various types of constraints used are discussed in greater detail below. The values for carrier-to-noise ratio ($C_{NO}$) and pseudorange (psr) output by the receiver 45 are used to assess the level of multipath on each observation, at step 105. If a particular observation is acceptable for use, a variance is assigned to it.

The presence of multipath signals can easily cause angular errors of forty five degrees in a phase observable. Multipath can induce transient errors of up to 0.5 cycles in some pathological environments for a double difference phase observation. The use of such erroneous carrier measurements results in unreliable ambiguity resolution. As can be appreciated by one skilled in the relevant art, the process of determining the cycle ambiguities can be improved significantly if the erroneous signals that result from extreme multipath corruption are not used, and if the signals which have smaller errors due to the presence of multipath are weighed appropriately.

In a conventional application, an RF receiver will not make use of observations transmitted from low-elevation satellites. However, multipath errors are not limited to low-elevation satellites, and in many environments all available satellites must be used if a solution is to be obtained. Accordingly, in the present application, the receiver 45 uses signals from every satellite in view and the heading sensor 40 combines multiple observations to estimate the multipath level on pairs of carrier observations from the primary antenna 41 and the secondary antenna 43. These observations produce values for four parameters, as follows.

The first parameter is $\Delta C_{NO} = C_{NO2} - C_{NO1}$, where $C_{NO1}$ is the primary antenna 41 carrier-to-noise ratio and $C_{NO2}$ is the secondary antenna 43 carrier-to-noise ratio. The first parameter $\Delta C_{NO}$ is filtered as a linear model.

The second parameter is the estimated rate of the difference of carrier to noise ratios, given by $$\frac{d}{dt}(\Delta C_{NO}).$$

This parameter is the second term in the linear model.

The third parameter is $\Delta$psr-proj where proj is the estimate of the baseline projection onto the line of sight to the corresponding satellite, $\Delta\text{psr} = \text{psr}_2 - \text{psr}_1$, $\text{psr}_1$, is the pseudorange value obtained at the primary antenna 41, and $\text{psr}_2$ is the pseudorange value obtained at the secondary antenna 43. The fourth parameter $\epsilon$ is the filtered version of the modeling error of the linear model used to generate $\Delta C_{NO}$ and $d/dt(\Delta C_{NO})$.

If $\epsilon$ is too large, then the observation generating this error is not used at all but instead an observation standard deviation $\epsilon$ is generated based on a linear combination of the square of the above four parameters. The multipath sensor is used only if the system is stationary. If the user specifies the multipath level as low, or when navigational system 10 senses motion, the various observations will be weighed in accordance with the elevation angle of the respective satellite. If the user specifies the multipath level as high, the heading sensor 40 will not use the observation from a particular satellite unless that satellite has been tracked continuously for at least 300 seconds. The latter capability should be used only if the system is stationary.

In way of example, there are approximately 64 million double-difference candidates, or 128 million single-difference candidates, in a search space encompassing twenty lanes for each of seven satellites. It can be shown that even low levels of multipath can result in having the correct set of ambiguity combinations appear to be less favorable than an erroneous set of candidates. To reduce the number of candidates, the search space is limited by imposing constraints on the baseline length, the pitch, the azimuth, or the velocity of the vessel or flight vehicle. Such constraints can be input by the user, in the same manner that offsets are input as described above, or the constraint data can reside in a memory device, such as a flash memory, or in RAM inside the computational unit 60. The reduction in the number of candidates when one or more constraints are imposed with a one meter baseline are summarized in Table 1.

TABLE 1

Reduction of Lane Space Requirements with Imposition of Constraints

| Length Constraint | Pitch Constraint (±10°) | Velocity Constraint (±20°) | Azimuth Constraint (±10°) | Number of Lanes |
|---|---|---|---|---|
| No | No | No | No | $1.28 \times 10^9$ |
| Yes | No | No | No | $2.0 \times 10^7$ |
| Yes | Yes | No | No | $3.38 \times 10^6$ |
| Yes | No | Yes | No | $1.21 \times 10^6$ |
| Yes | No | No | Yes | $5.58 \times 10^5$ |
| Yes | Yes | Yes | No | $7.58 \times 10^5$ |
| Yes | Yes | No | Yes | $1.89 \times 10^5$ |

The use of appropriate constraints is reasonable in almost every environment and their use increases the reliability of the heading sensor 40 by a significant amount. If the pitch is constrained by ±10°, the velocity constrained by ±20°, and the baseline length is constrained by ±2 meters, the potential search space is decreased by a factor of 80 in comparison to the case where only the baseline length is constrained.

The computed observation variances and the observation geometry are used to generate a variance-covariance matrix for the inter-antenna baseline 49, at step 107. At step 109, the observation variance and baseline variance are used to generate uncertainty levels for the residuals to be generated and used in a subsequent Kalman Filter or other estimation process. The residual uncertainty level is used to compute a rejection threshold for the sum of squares of the residuals, in step 111.

Using the constraints or the pseudorange and carrier observations, a probable position for the secondary antenna 43 is generated, at step 113. The resulting vector is used in conjunction with the uncertainty found in step 107 to derive a center for an ambiguity search space, and to derive satellite-dependent dimensions for the search space. The search space so derived, at step 115, will have $s^n$ possible combinations of carrier ambiguity candidates, where s is the number of possible ambiguities for a particular observation and n is the number of observations.

For each possible candidate, a corresponding baseline and associated residual statistics are computed, at step 117. The computed baseline is compared to the user-defined constraints for agreement. If the baseline fails the constraint 'test,' the corresponding ambiguity set is rejected. If the baseline passes the constraint test, the sum of squares of the baseline residuals is compared to the threshold computed at step 113.

Each candidate is retained or rejected based on any one of three acceptance criteria: i) the size of the residual statistic compared to its expected value; ii) the size of the residual statistic compared to the statistic for other ambiguity candidates; and iii) the degree of agreement that the computed baseline has with the baseline defined by the constraint values input by the user. This procedure can be explained in greater detail with reference to the Magill adaptive filter disclosed in R.G. Brown and P. Hwang, *Introduction to Random Signals and Applied Kalman Filtering*, $3^{rd}$Ed., John Wiley and Sons, 1997.

After carrier ambiguity candidates exceeding any of the above acceptance criteria have been rejected, the heading sensor 40 utilizes a series of observations to estimate the multipath level on successive pairs of carrier observations obtained from the primary antenna 41 and the secondary antenna 43. As more observations are generated, steps 101 through 117 are repeated until only one candidate remains, at step 119. This remaining set of ambiguities and line bias are used with succeeding observations to generate time-dependent inter-antenna baselines and associated azimuth and pitch angles, at step 121.

Figure 4:
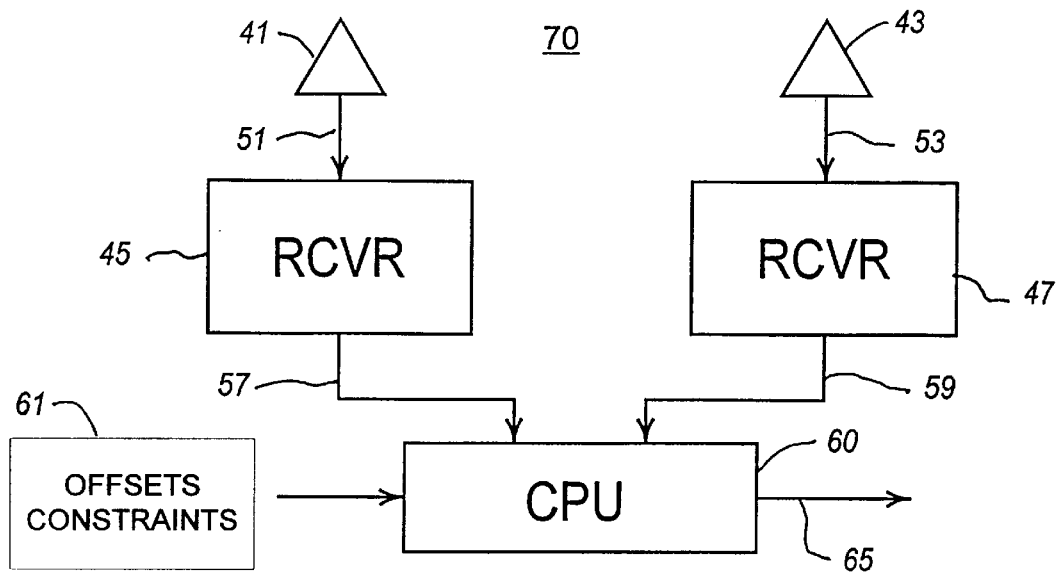
FIG. 4 is a functional block diagram of an alternative embodiment of the sensor of FIG. 1.

In an alternative embodiment, shown in FIG. 4, a beading sensor 70 includes a secondary receiver 47 receiving the positioning signal 53 from the secondary antenna 43 and outputting a signal 59 to the computational device 60. The receiver 45 receives the positioning signal 51 from the primary antenna 41 and outputs a signal 57 to the computational device 60, as in the embodiment above. In this configuration, positioning signals from six satellites will produce five double-difference observations.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A navigational apparatus suitable for use with a plurality of satellites, each satellite transmitting a positional signal, the signal being carrier modulated with code and date, said navigational device comprising:

a primary antenna for acquiring a set of primary positional signals from the plurality of satellites;

a secondary antenna disposed in fixed relationship to said primary antenna, said secondary antenna for acquiring a set of secondary positional signals from the plurality of satellites;

receiver means in electrical communication with at least one of said primary and secondary antennas, said receiver means for inputting at least one said set of primary or secondary positional signals and for outputting post-correlation data derived from said at least one set of primary or secondary positional signals;

means for deriving a carrier-to-noise ratio for each said positional signal from said post correlation data;

means for deriving multipath error estimates from said signal to noise ratios;

means for reducing carrier ambiguity sets according to pre-determined criteria;

means for deriving an azimuth or pitch estimate using said multipath error estimates to optimally generate an azimuth and pitch estimate.

2. The navigational apparatus of claim 1 wherein said post-correlation data comprises at least one member selected from the group consisting of single-difference observation and double-difference observation.

3. The navigational apparatus of claim 1 wherein said receiver means comprises a Global Positioning System receiver.

4. The navigational apparatus of claim 1 further comprising memory means.

5. The navigational apparatus of claim 1 further comprising a processing unit in electrical communication with said navigational apparatus and a magnetic sensor in electrical communication with said processing unit.

6. The navigational apparatus of claim 1 further comprising a second receiver means in electrical communication with the other of said primary and secondary antennas, said receiver means for inputting the other of said set of primary or secondary positional signals and for outputting post-correlation data derived from said other set of primary or secondary positional signals.

7. The navigational apparatus of claim 1 wherein said means for deriving a carrier-to-noise ratio comprises a computational device.

8. A method for deriving an attitude, pitch or positional reading for a vessel or flight vehicle from signals transmitted by a plurality of positional satellites, said method comprising the steps of:

acquiring a set of primary positional signals from the plurality of satellites via a primary antenna;

acquiring a set of secondary positional signals from the plurality of satellites via a secondary antenna;

deriving post-correlation data from said sets of primary and secondary positional signals;

deriving a signal-to-noise ratio for each said positional signal from said post correlation data;

deriving a multipath estimate from said signal to noise ratios; and estimating an azimuth or pitch reading from said multipath estimate.

9. The method of claim 8 wherein said step of deriving a multipath estimate comprises a step of applying a Kalman filter.

10. The method of claim 8 further comprising the step of reducing carrier ambiguity sets in accordance with pre-determined criteria.

11. The method of claim 10 wherein said pre-determined criteria comprises at least one member of the group consisting of: the size of a residual statistic compared to its expected value; the size of a residual statistic compared to statistics for other ambiguity candidates; and the degree of agreement that a computed baseline has with a baseline defined by the constraint values input by a user.

12. The method of claim 8 further comprising the step of calculating differential signal-to-noise ratios for each said positional signal.

* * * * *